(12) United States Patent
Miller et al.

(10) Patent No.: US 10,949,156 B2
(45) Date of Patent: Mar. 16, 2021

(54) DIGITAL MEDIA DISPLAY SYSTEM

(71) Applicant: Mx2 Holdings LLC, Chicago, IL (US)

(72) Inventors: Michael Robert Miller, Chicago, IL (US); Dylan Scott McFadden, Chicago, IL (US); Aaron Richard Baker, Palatine, IL (US)

(73) Assignee: Mx2 Holdings, LLC, Chicago, IL (US)

( * ) Notice: Subject to any disclaimer, the term of this patent is extended or adjusted under 35 U.S.C. 154(b) by 0 days.

(21) Appl. No.: 16/751,238

(22) Filed: Jan. 24, 2020

(65) Prior Publication Data

US 2020/0241825 A1 Jul. 30, 2020

Related U.S. Application Data

(60) Provisional application No. 62/796,329, filed on Jan. 24, 2019.

(51) Int. Cl.
| | | |
|---|---|---|
| G06F 3/14 | (2006.01) | |
| G06F 3/0482 | (2013.01) | |
| G06F 9/54 | (2006.01) | |
| H04L 29/08 | (2006.01) | |
| G06F 3/0484 | (2013.01) | |

(52) U.S. Cl.
CPC .......... *G06F 3/1423* (2013.01); *G06F 3/0482* (2013.01); *G06F 3/04847* (2013.01); *G06F 9/547* (2013.01); *H04L 67/12* (2013.01)

(58) Field of Classification Search
CPC ...... G06F 3/1423; G06F 3/0482; G06F 9/547; G06F 3/04847; H04L 67/12; G09G 2380/16; G09G 2320/08; G09G 2320/10
See application file for complete search history.

(56) References Cited

U.S. PATENT DOCUMENTS

2011/0060994 A1* 3/2011 Maxwell ................. H04L 67/32
715/730

* cited by examiner

*Primary Examiner* — Andrey Belousov
(74) *Attorney, Agent, or Firm* — Adam K. Sacharoff; Much Shelist, P.C.

(57) ABSTRACT

There is provided a custom display for high resolution 4k and greater art, video, and digital displays in several different capacities and monitor configurations. This is controlled via an app that can reside on smart phone, tablet, laptop, or desktop computer. Dependent on the monitor configuration and content we can display this in over 4k quality for an unparalleled user experience.

9 Claims, 33 Drawing Sheets

DIGITAL MEDIA DISPLAY SYSTEM

CROSS REFERENCE TO RELATED APPLICATION

The present invention claims priority to U.S. Provisional Application 62/796,329 filed Jan. 24, 2019.

BACKGROUND OF THE INVENTION

The invention relates to a digital media display system.

SUMMARY OF THE INVENTION

This is initially designed is to combine a custom authentic design to each user to integrate into high end residential design, hospitality, and commercial uses. The aesthetics of the composition of the display will be equally important to bring this to life. The purpose is to display high resolution 4k art, video, and digital displays in several different capacities and monitor configurations. Due to the gallery relationships we will have licensed art from a collection of the best artists in the world as content. It is also possible to create customized programming and content dependent on each user. This will be controlled via an app that can reside on smart phone, tablet, laptop, or desktop computer. Dependent on the monitor configuration and content we can display this in over 4k quality for an unparalleled user experience. Customers will pay for the design, installation, programming, and be able to subscribe to art & video in different capacities from high end artists which our platform will exclusively license.

Numerous other advantages and features of the invention will become readily apparent from the following detailed description of the invention and the embodiments thereof, from the claims, and from the accompanying drawings.

BRIEF DESCRIPTION OF THE FIGURES

A fuller understanding of the foregoing may be had by reference to the accompanying drawings, wherein.

DESCRIPTION OF THE INVENTION

Figure 1:
FIG. 1 is a representation of three monitors installed in accordance with an aspect of the present invention system and shown displaying fine art.
Figure 2:
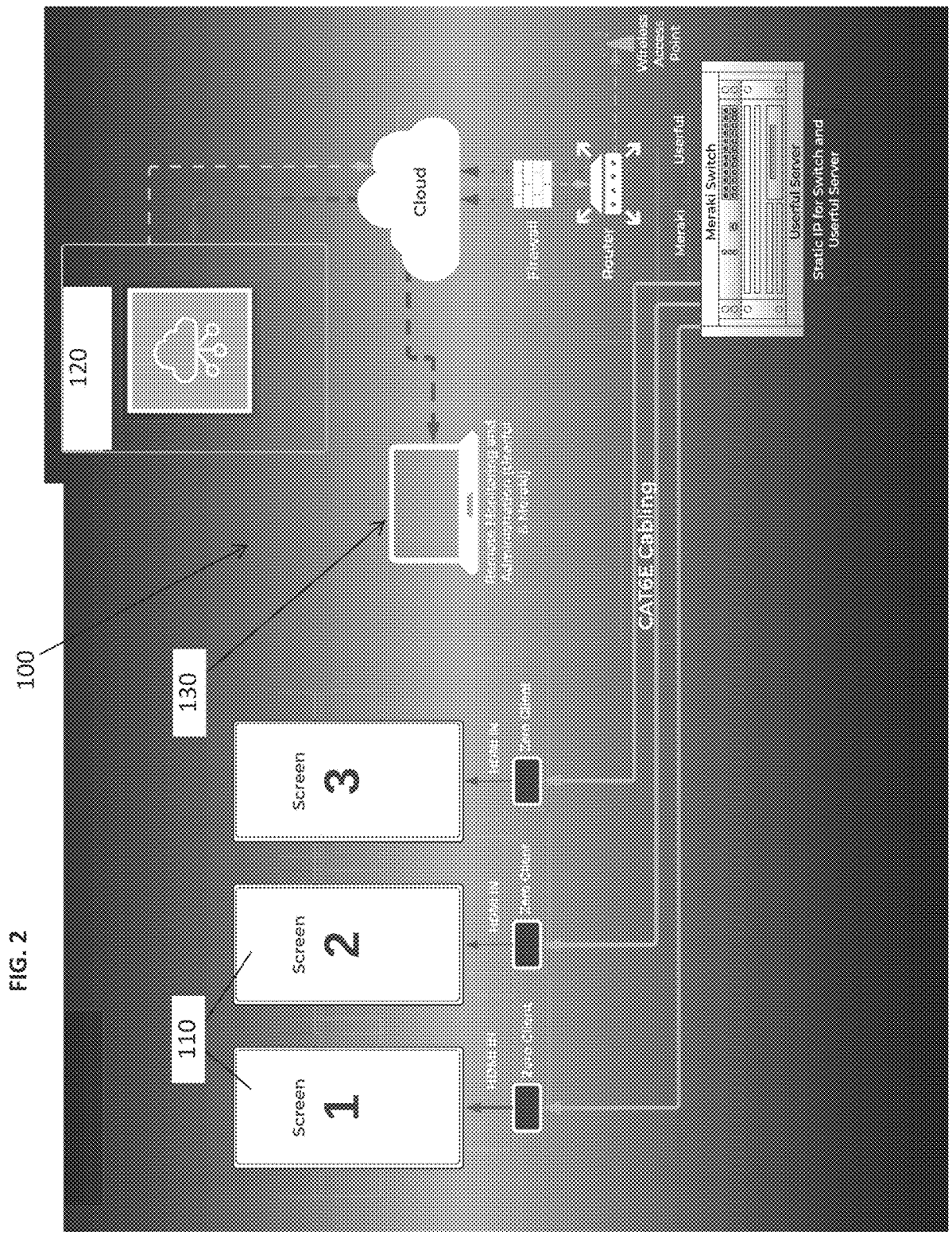
FIG. 2 is a system representation of an aspect of the present invention.
Figure 3:
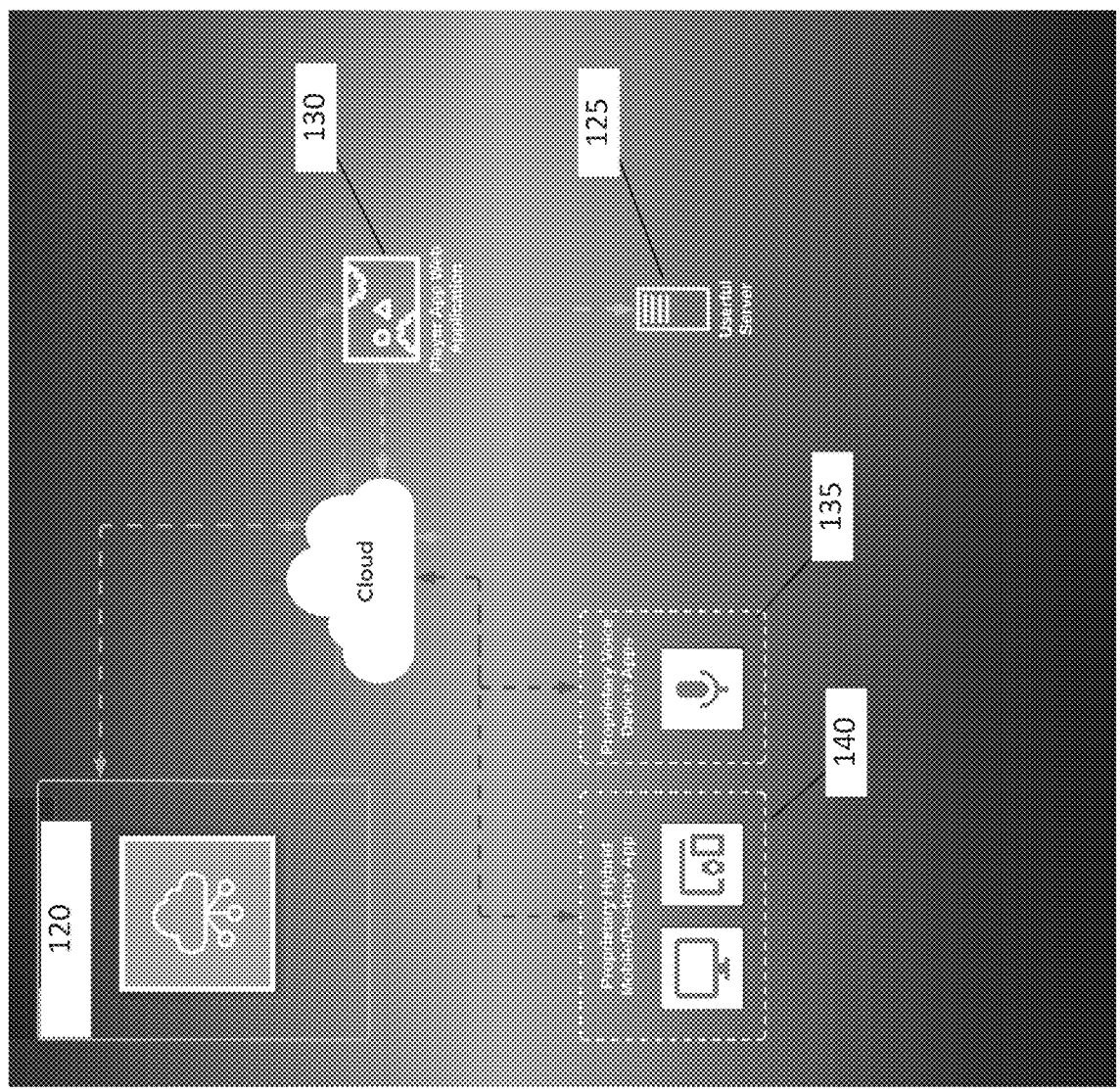
FIG. 3 is a system representation of cloud-based interaction between various aspects of the present invention.
Figure 4:
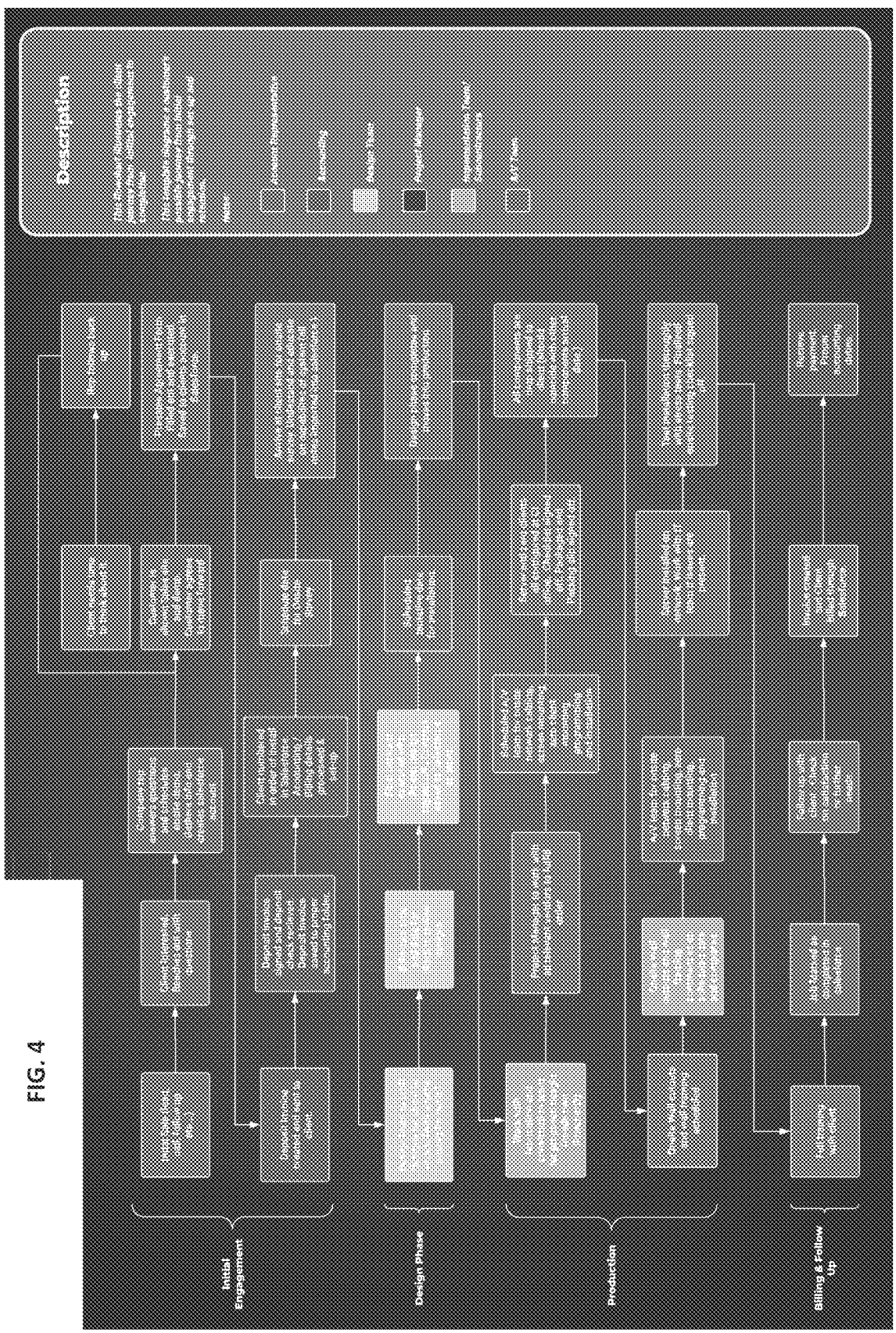
FIG. 4 is a system representation of various aspects of the present invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Referring now to FIGS. 1-33, the invention relates to a system 100 for utilizing a subscription-based service to display high end images or fine art on monitors 110 positioned on a wall or stand. The monitors are high end resolution monitors constructed to be encased in a finish material to be mounted into or onto a wall. While it is possible to have the monitors free standing, the concept is to have the monitors displayed as art would be displayed in a gallery. The design aspect of the monitors is (a) a high-end design per user application; (b) Construction will encase the monitors in many different finish materials for high end aesthetic use and feel (Millwork, Stone, Metals, Drywall, etc.); and (c) Integration into smart home technology and control systems for the easability of the user's interface and control.

The monitors are 4k Video display smart monitors and can be various sizes and arranged in any configuration. The monitor(s) loop into a single control system for communication purposes. Other features of the monitor(s) may include the ability to have remote cloud access for content storage.

A web based application will be run on either an on-site server or displays on-board system (a) Functionality to display content on monitor(s); (b) Ability to access & display licensed content; (c) Ability to create and display custom content; and/or (d) Ability to create and play live image (single image with video effects).

The system includes a backend API that facilitates transmission of requested data to the applications. The backend API 120 is also responsible for managing the state of the user's content (stored on a server 125), what is currently showing, what has been purchased, etc. In addition, the Backend API is designed to handle requests from voice service devices (135) such as Amazon Alexa and Google Home. The system further includes a frontend software-based web application, frontend app 130, that is running on an on-site server and is only accessible with authentication. The frontend app 130 loads information about the user's monitor configuration and current playlist, then uses an algorithm to position the images in the playlist onto corresponding monitors as designated by the user. The frontend app 130 syncs with the same data that the user app 140 (discussed below) accesses, so when the user app 140 sends a message to the backend API, the frontend app 130 will receive the data.

The system would also include a software-based user application running on a desktop/laptop, mobile tablet, or phone. The user app 140 would be user friendly and simple to execute functions intuitively. The user app 140, as discussed further herein, would further allow the user to purchase licensed art for display on the monitors, allow users to create subscription-based services, and make payments for the subscriptions or licenses. The user app 140, while being configured to send images/videos to the monitor(s) in any particular arrangement or configuration, the user app 140 is also to configured to protect the images from being copied, forwarded, stored, or edited from the user's device. The user app 140 must also be configured to delete complete user profile due to nonpayment with loss of content.

The user app 140 is further configured to configured to (a) search & scroll available content; (b) create organized user playlists, multiple playlists, and scenes; (c) change art based on item selected—this can be done without interrupting what is currently displayed for smooth transitions; (d) create custom time intervals for each monitor to change automatically; (e) drag image into each monitor place holder on app to display; (f) play video clip on single monitor; (g) stretch & play single video across all monitors; (h) loop any profile or playlist setting for seamless transitions; (i) play customized content, such as branding logos and marketing materials, or even emergency/safety information loaded to the user app 140 in case of emergency, weather, or building information. Lastly, the app is configured to stream content or wirelessly play personalized content or photo to the monitor on the digital network sent by the app.

Figure 5:
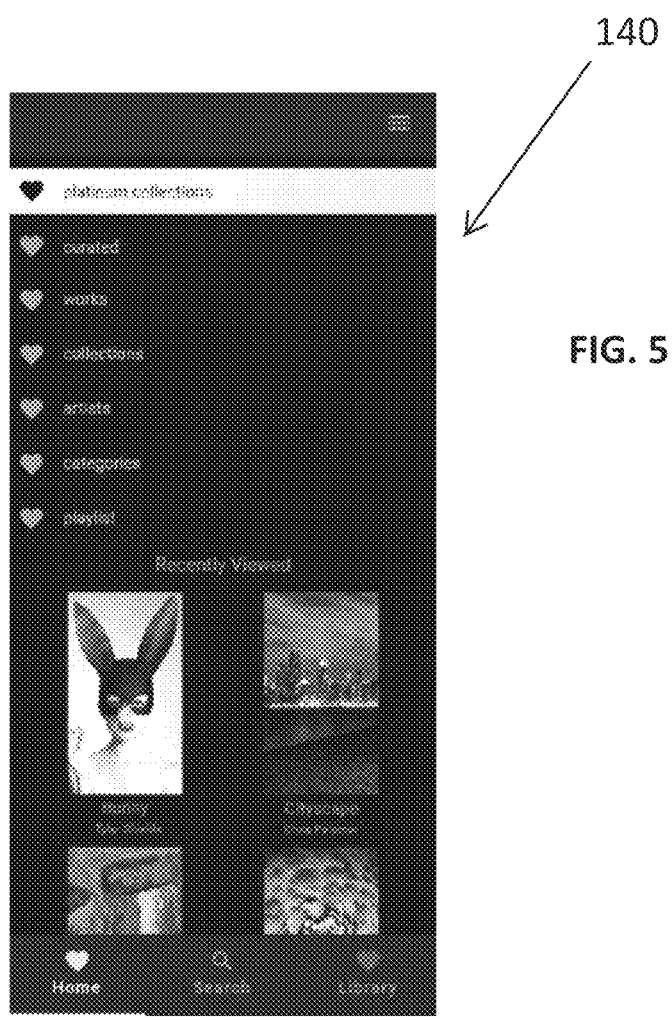
FIGS. 5-19 are various APP screens of various embodiments of the present invention.
Figure 6:
Figure 7:
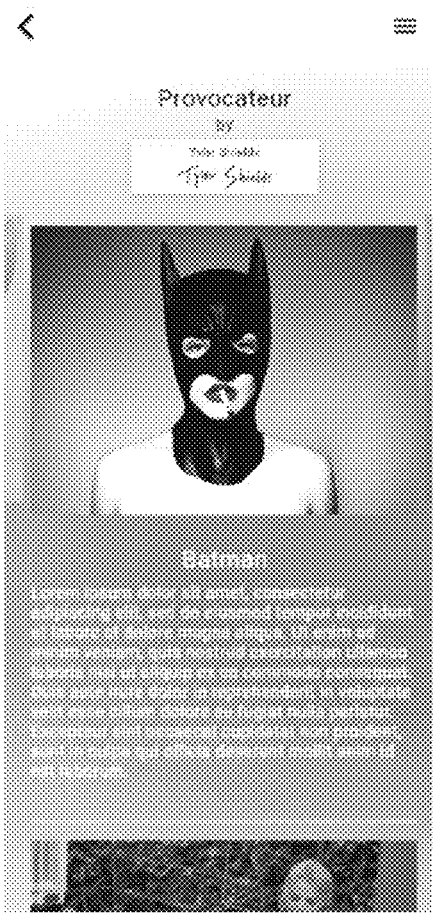
Figure 8:
Figure 9:
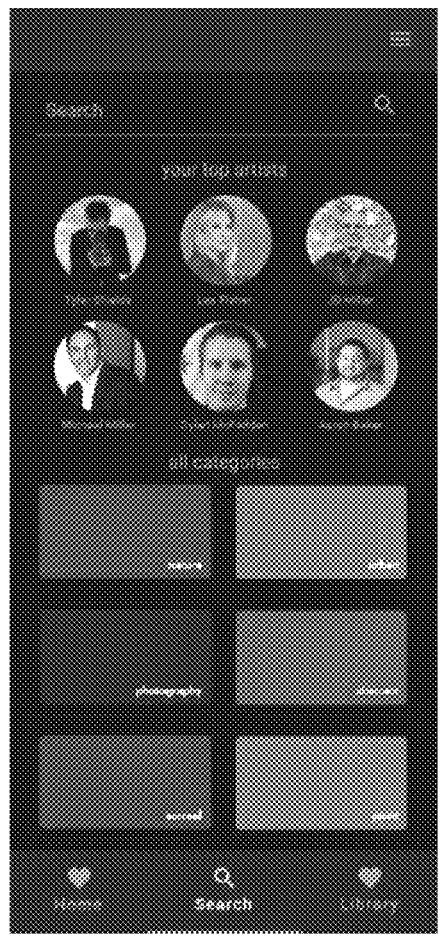
Figure 10:
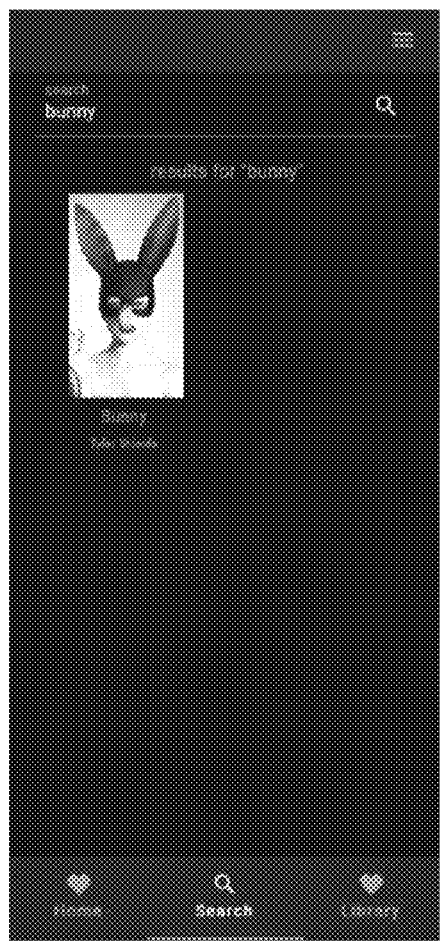
Figure 11:
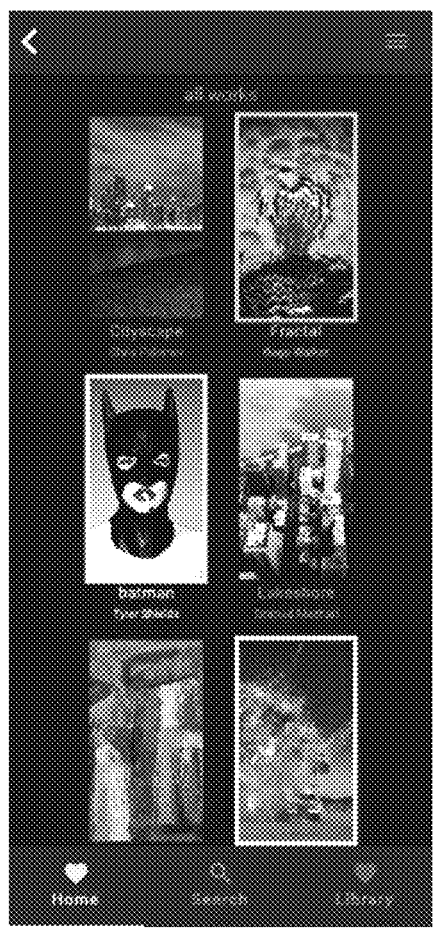
Figure 12:
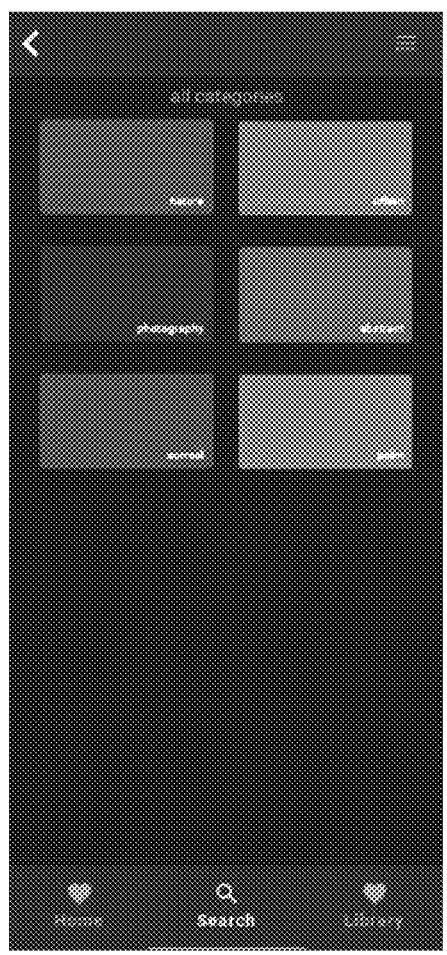
Figure 13:
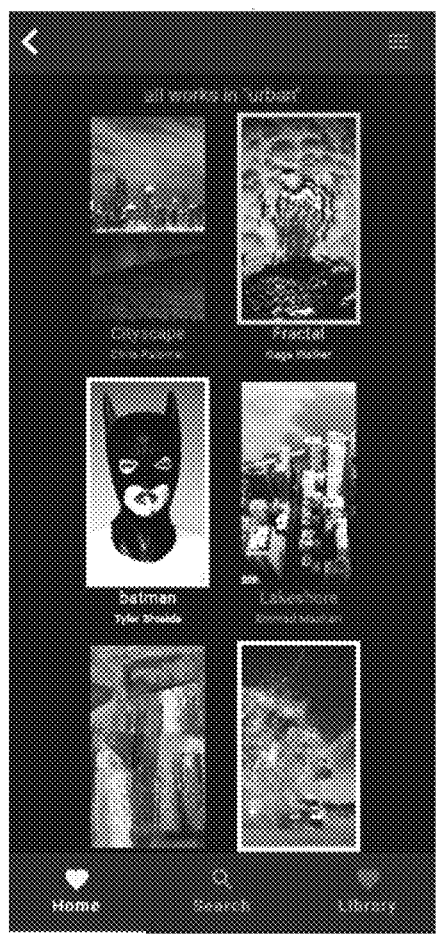
Figure 14:
Figure 15:
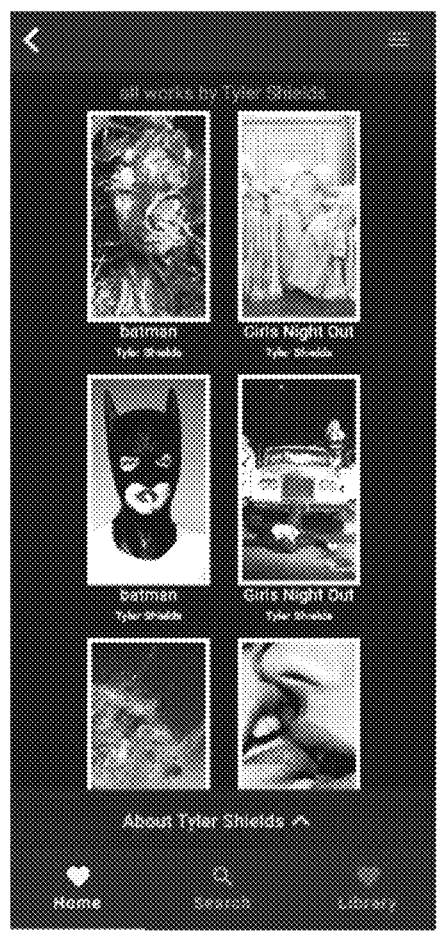
Figure 16:
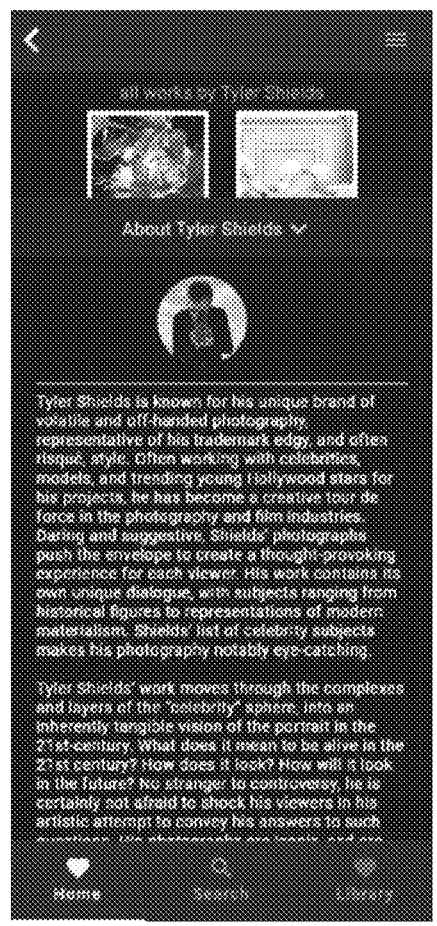
Figure 17:
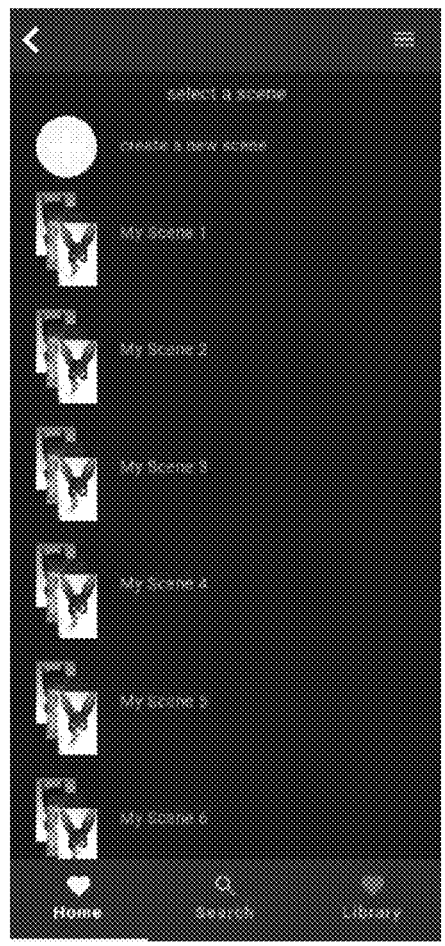
Figure 18:
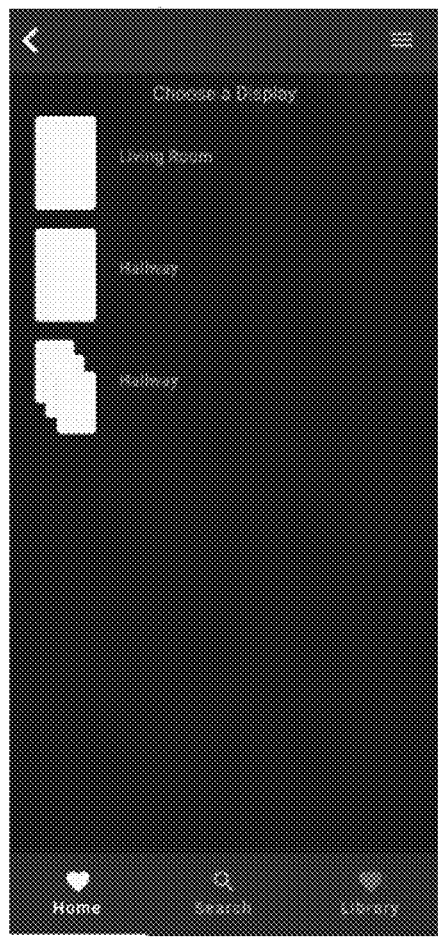
Figure 19:
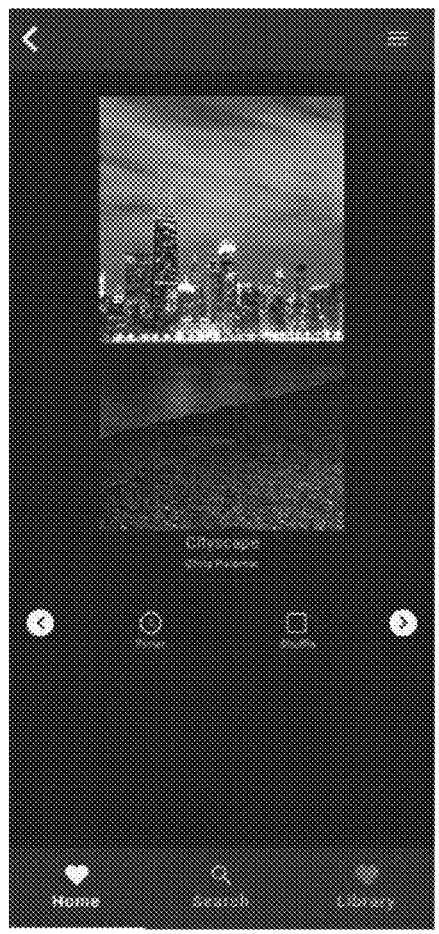
Figure 20:
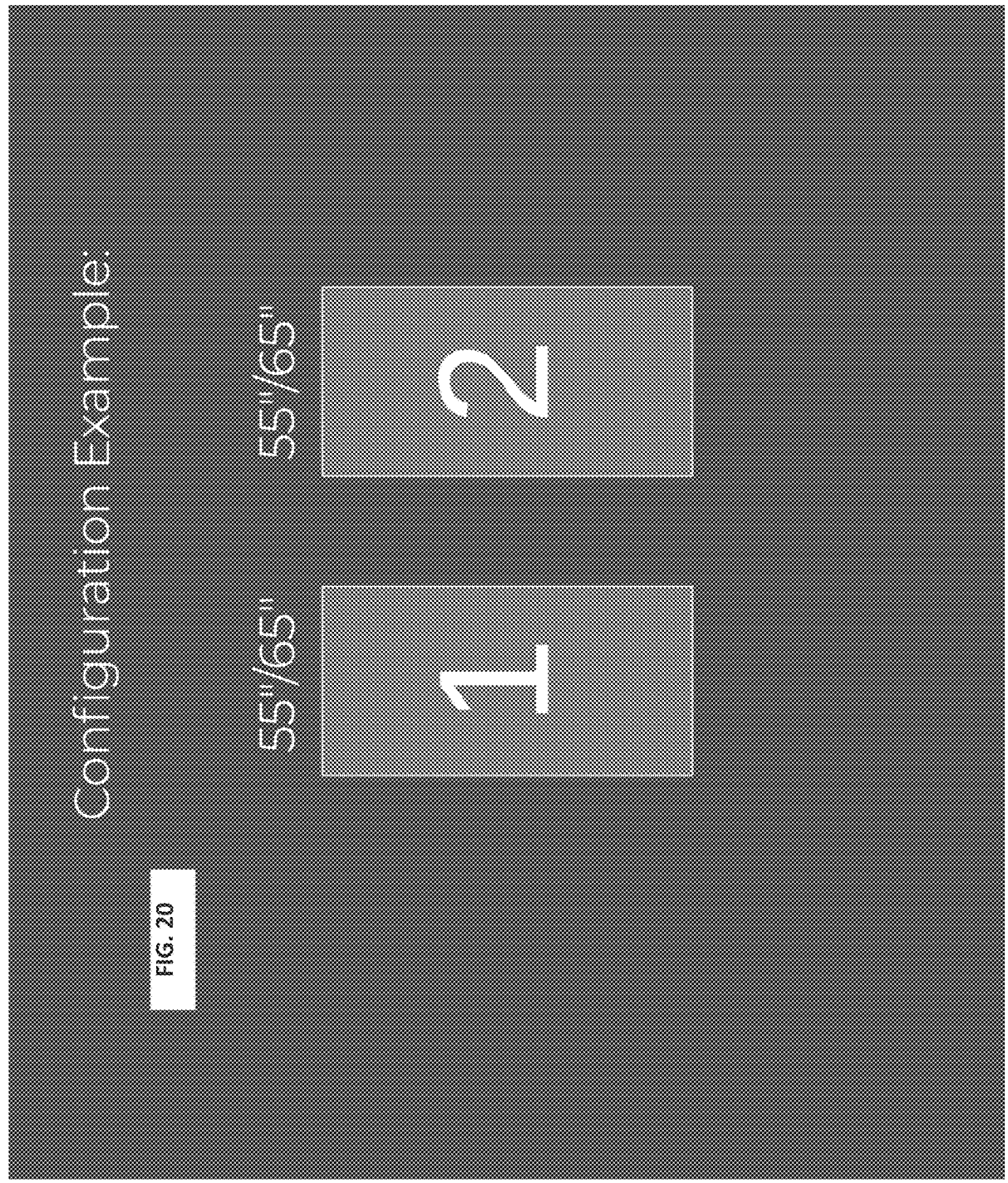
FIGS. 20-24 are various monitor configurations for embodiments of the present invention.
Figure 21:
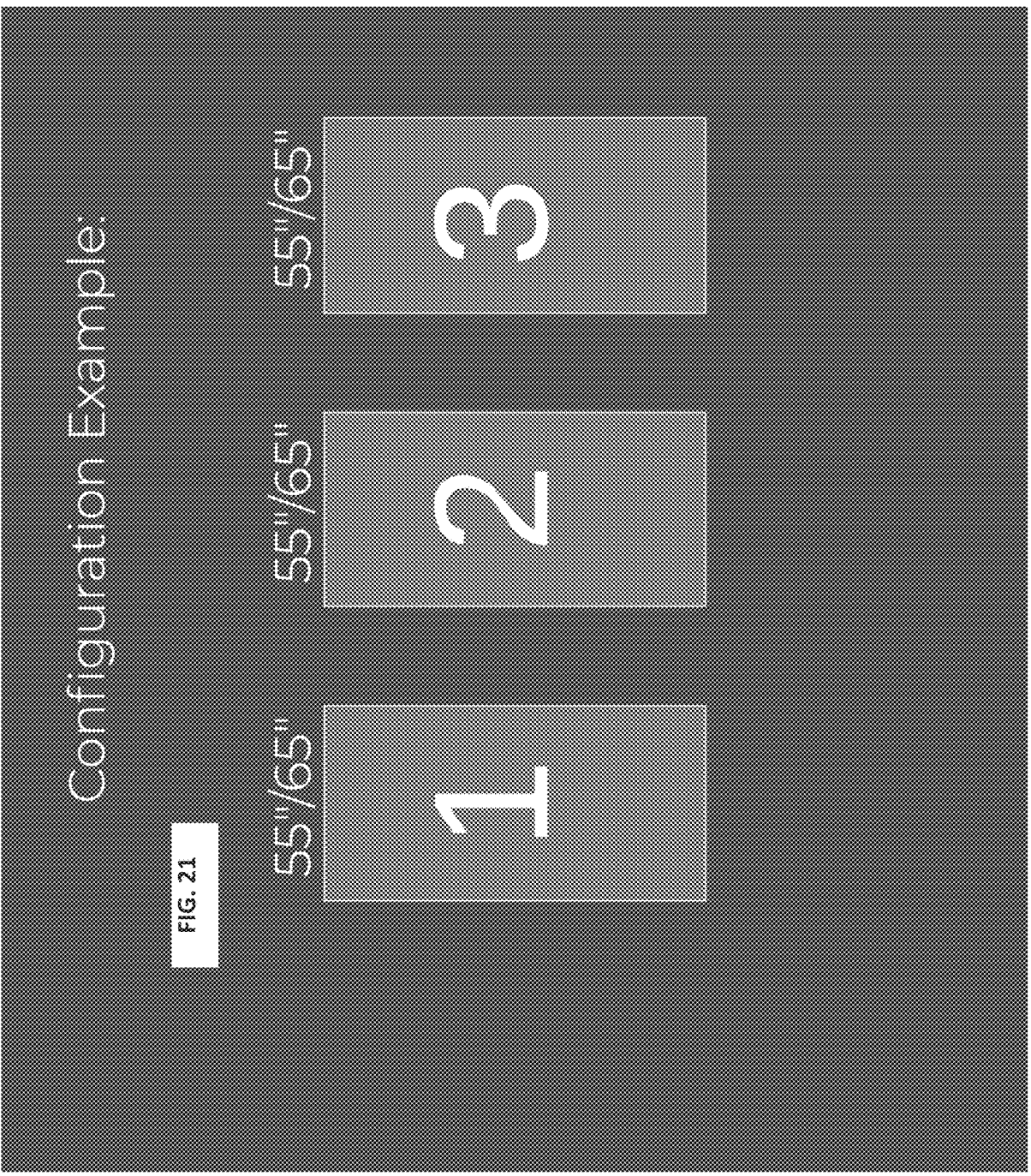
Figure 22:
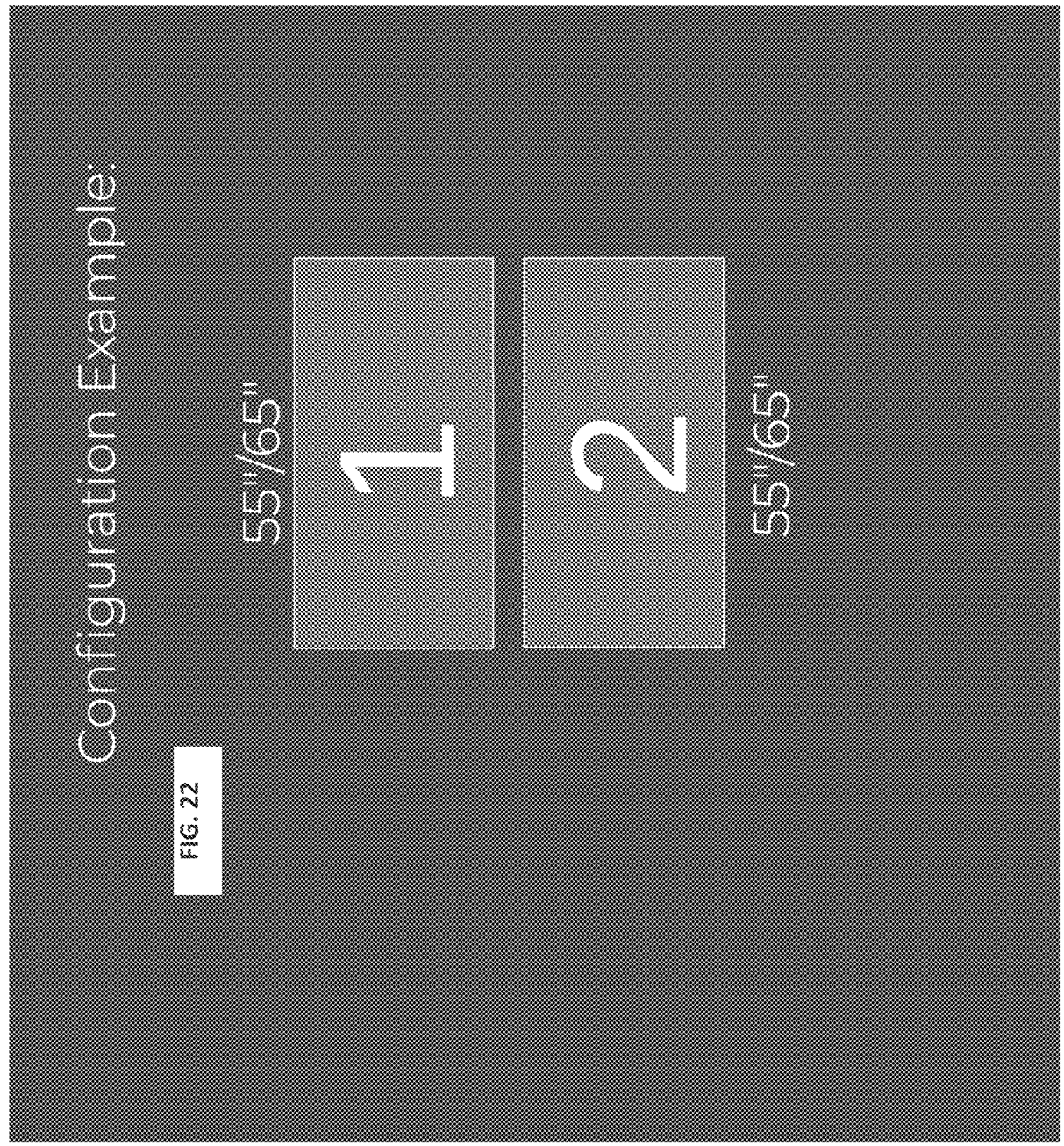
Figure 23:
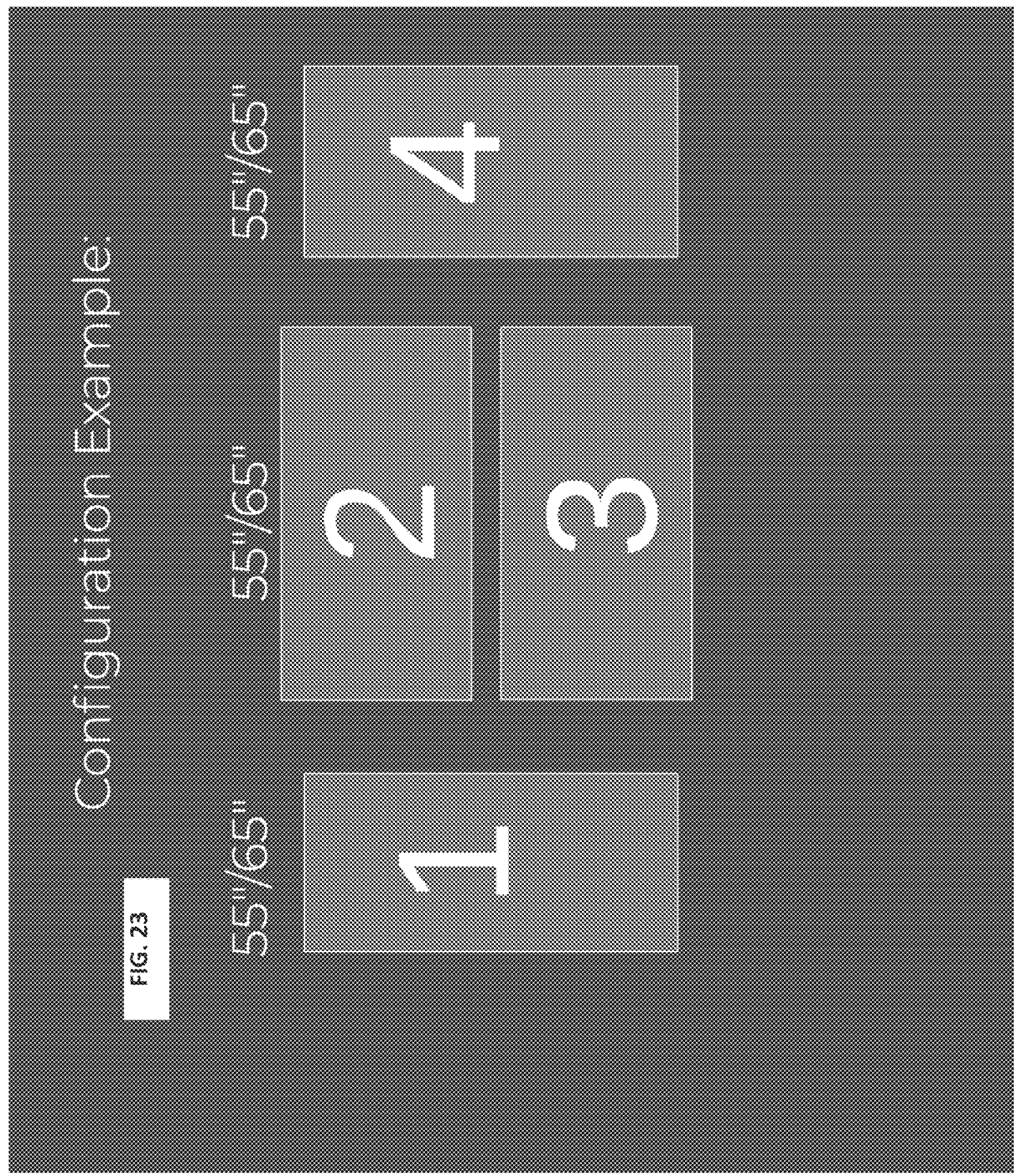
Figure 24:
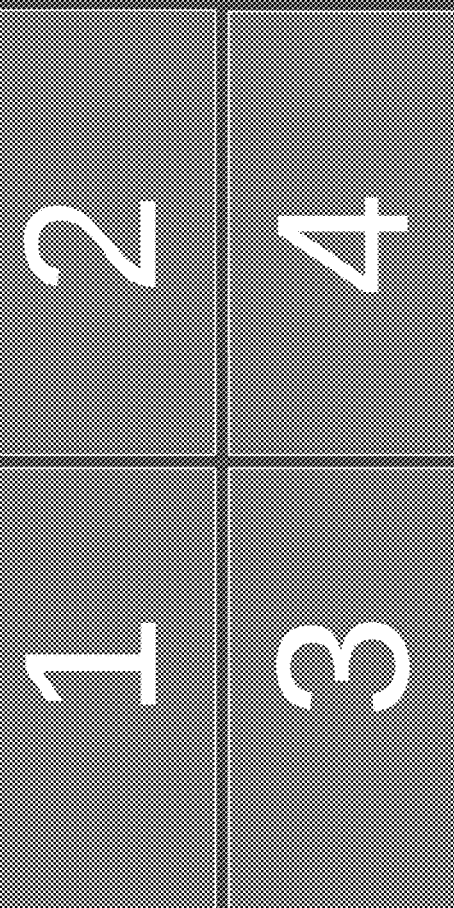
Figure 25:
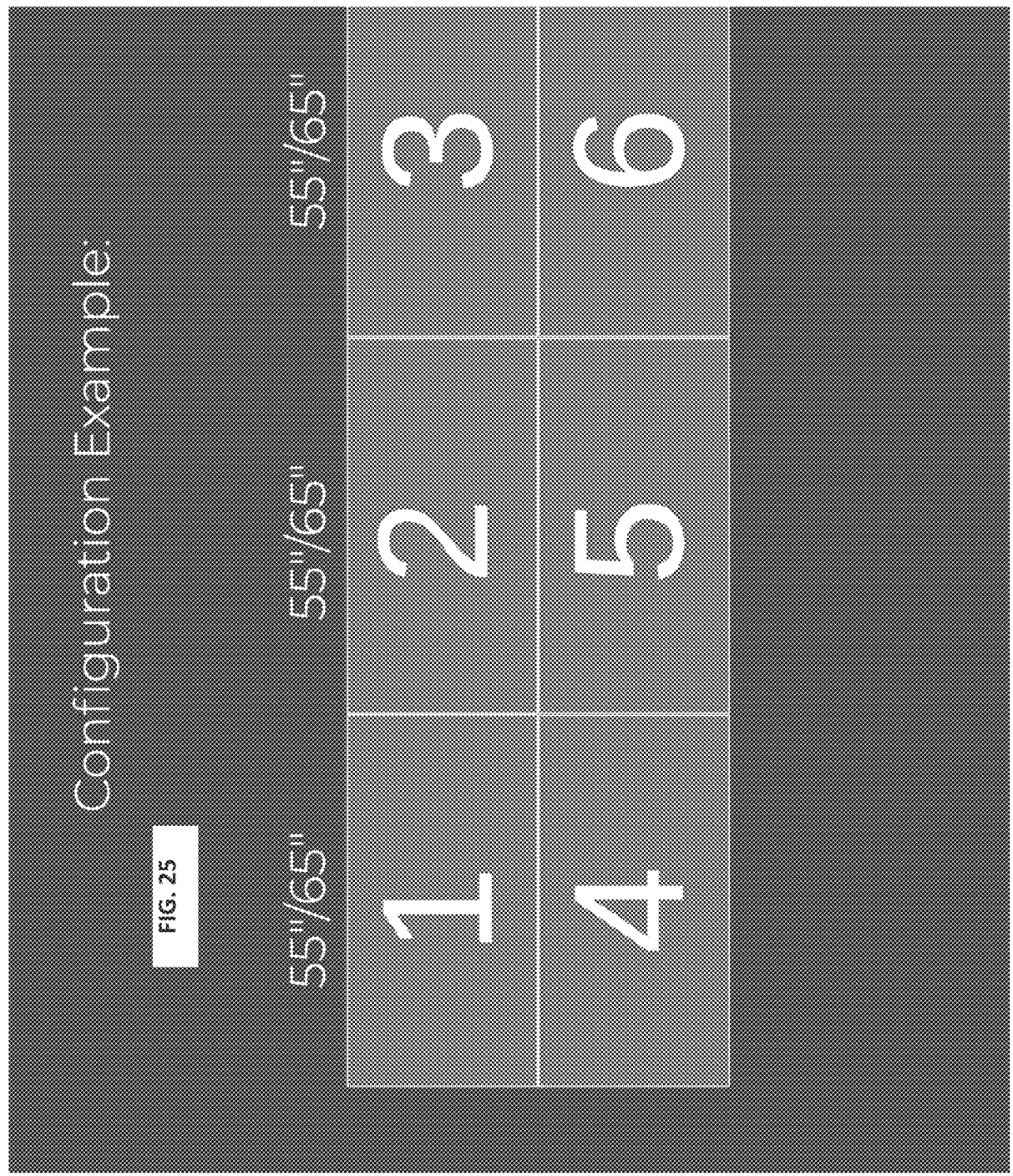
FIGS. 25-33 are various monitor configurations as visually represented on the APP and as corresponding real monitor installation.
Figure 26:
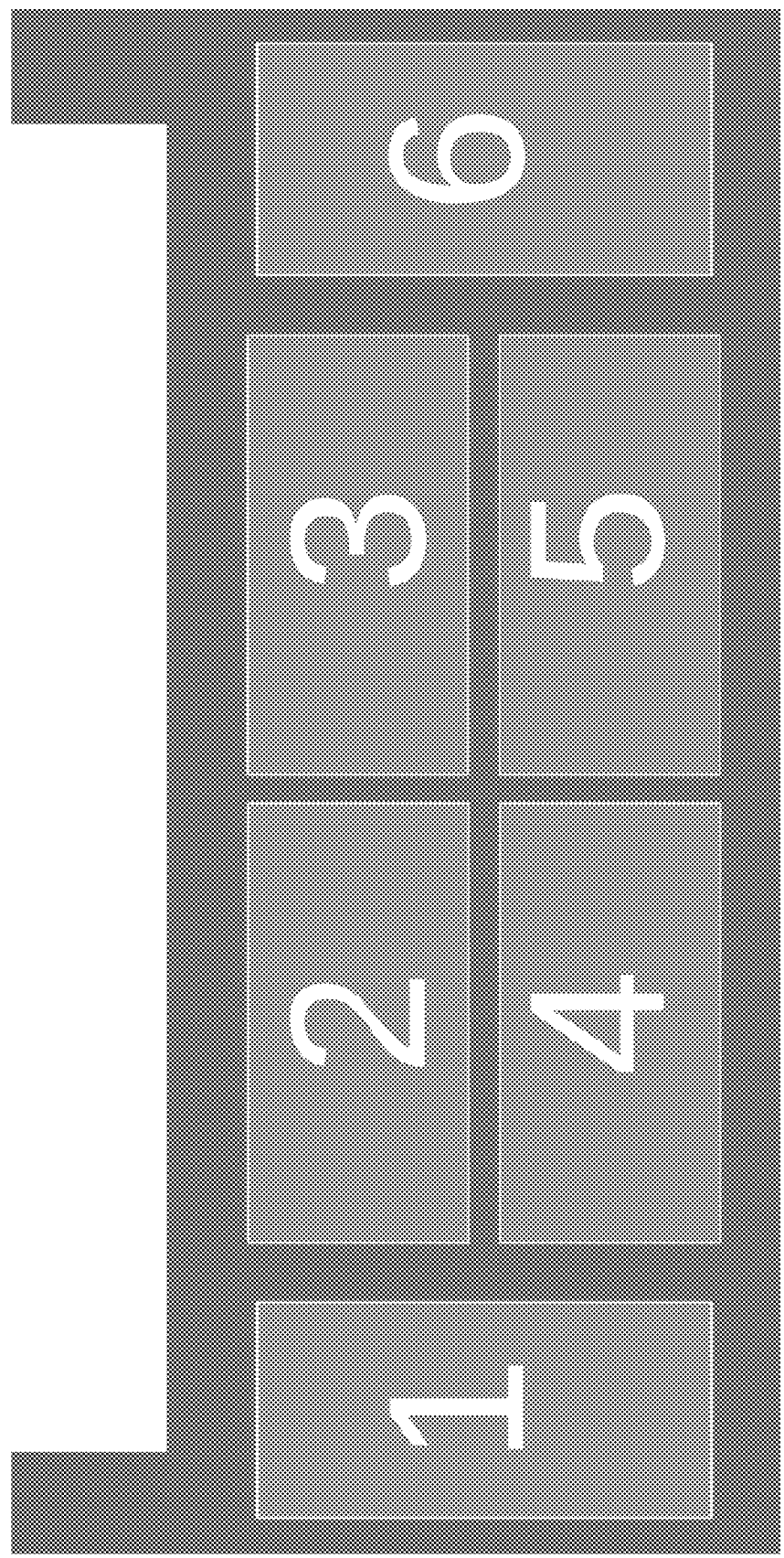
Figure 27:
Figure 28:
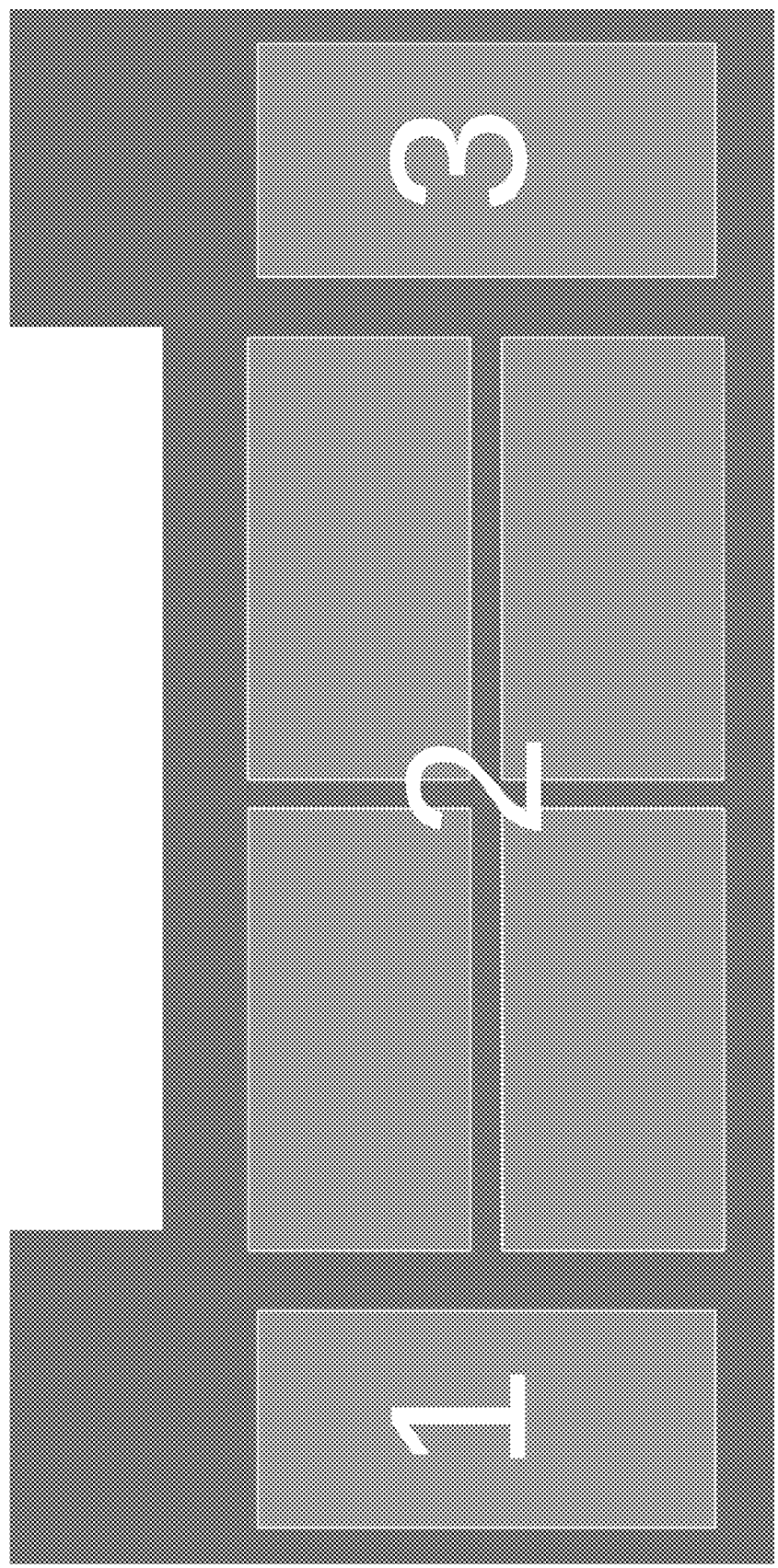
Figure 29:
Figure 30:
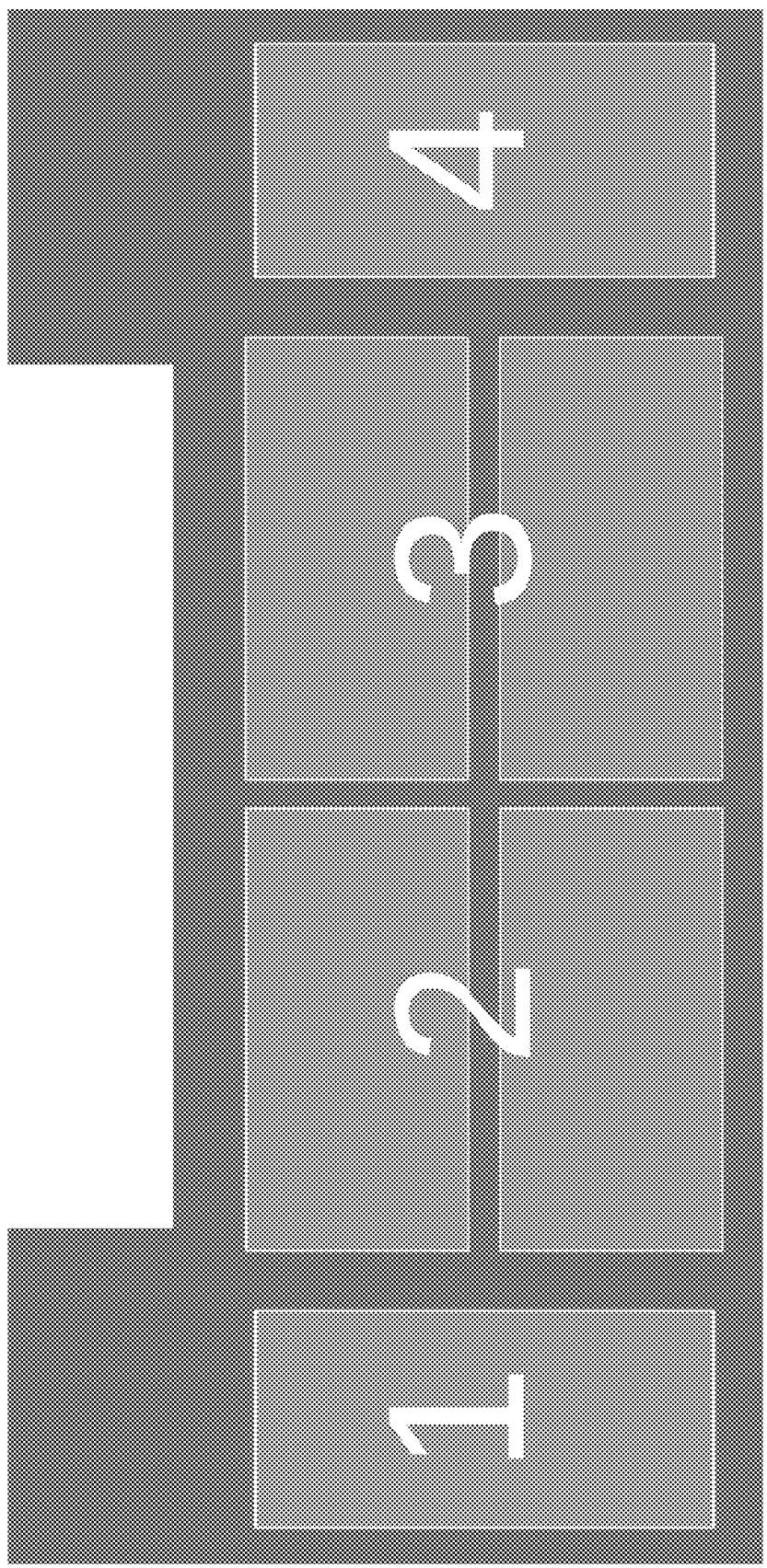
Figure 31:
Figure 32:
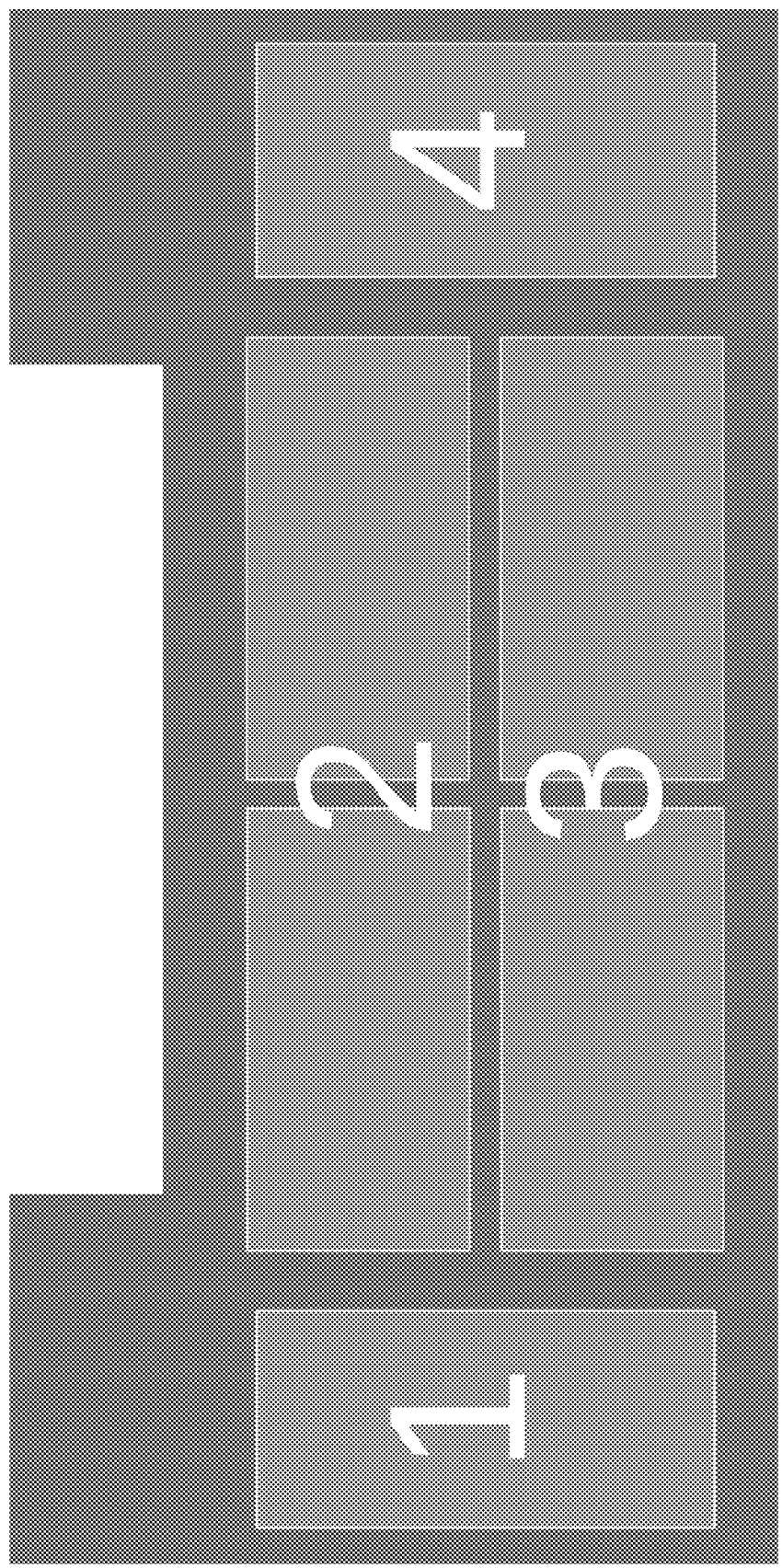
Figure 33:

As represented by FIG. 5, through 19, the user App 140 illustrates the various content available to the user. FIG. 5 shows a home screen. After the user logs in, the user arrives at the home screen from which they can navigate to almost any other part of the App 140. The user can also select from recently viewed content. upon doing so, the user will select a display on which to show that particular content selected. FIG. 6 shows a collection screen. The collection screen lists limited edition, digital content created exclusively for the license. The user can select a particular collection to view details about the artist or work, FIG. 7, or preview collections, FIG. 8, that are being released at a later time. FIG. 9 illustrates a search screen. The search view allows the user to navigate through the content based on one or more keywords. The can search for an Artist, a Work, or a Genre, for example. The user will also be presented with artists and genres that have been recently or often searched for, or other content based on analytics relevant for the user. If the user selects one of these, the user App 140 can navigate to a content list by artist, FIG. 15, or content list by genre, FIG. 13. FIG. 10 shows a typical search results screen that shows any results related to the user's query. FIG. 11 shows all content lists, through which a user can scroll through. FIG. 12 shows genre categories for a user to select. FIG. 13 (as noted above) is a screen showing content with a specific genre titled "urban". FIG. 14 is an artist list which when selected can list the artist and where specific content is tagged. FIG. 15 (as noted above) is a screen showing all content under a specific artist, which can then be expanded to see details about the artist, FIG. 16. FIG. 17 shows a scene list. Scenes are a saved arrangement of content across a user's displays. The scene list is where a user can find and select a previously saved scene to show. Once a scene is selected the app will navigate to a display list, FIG. 18. FIG. 18 is a display screen. After a user finds content or a scene they want to display, the user selects which monitor to show it on. On the display list, a user can find all of their display installations. Once one is selected, the content will appear on that installation (one or more displays) and the user app 140 will navigate to the media control, FIG. 19. The media control screen, FIG. 19, the user can further control the content playing on the monitor(s). The user can see information about the content currently playing, such as the artist's name and title of the work. The user can also set the timer/duration for each piece of content, is able to set a shuffle for a series of content or skip to the next/previous item in a scene or series.

The content being displayed is preferred to be fine art images and videos. The digital art content would be made available from high-end artists, with the content in some circumstances created exclusively for the system. These could also include gallery works. Additional digital art content could be created specifically for the user. The system could also stream images or video from internet. Added content to the system could also allow a user to remotely display a photo or video from the user's phone to the display.

The system could find both residential and commercial uses. Displays in private homes for more higher end individuals. Since most end users do not have the access, space or funds to procure fine art, the ability to display fine art digital images is now made as a more affordable alternative. Commercial uses can include lobbies (both building and business), restaurants, clubs, retail stores and showrooms, institutional uses. The system can also be used to display presentations, marketing materials or product images such as if installed in a retail store.

The system as outlined herein provides for the display of vertical high-resolution images on individual monitors (images to refer to both static images, gif images, and videos). The system can also stretch a single image across multiple monitors. The system would typically have an auto time frequency to change images, with each monitor being configured to change independently (staggered) or in conjunction with the others. The user through the app is able to configure a playlist of images across the display(s). The app is provided to control the content remotely, thus removing the monitor from having to display selection menus, allowing for a more seamless integration between the displays and the images. The system is also configured to allow multiple monitors to display various images, such that one monitor is able to display a video while other display images. The system is further configured to display different images, different sizes, and at different times, these can be set automatically or customized by the user on the app. Just as an image can stretch across multiple monitors, the system is also configured to stretch a single video across multiple monitors.

Referring now to FIGS. 20-33 various arrangement and configurations of the monitors can be shown. In FIG. 26-33, the system can take a particular arrangement and provide a user with dynamic control of the display of the content. The user App is configured to allow the user to designate an arrangement or grouping of monitors. As such, in FIG. 26 all six individual monitors are distinguished such that six different content images can be displayed at the same time; while in FIGS. 28-32 the arrangements are different to allow stretching of content between specific groups of monitors.

The system in one embodiment is configured under the following elements: a custom system that includes a wall installation of three flushed vertical oriented monitors in a vertical configuration and all electrically communicated together. The monitors are stepped to mirror a vertical ascent of a staircase. Each of the monitors is a Samsung UD55E-B Series 55" Direct-Lit LED Display and each is installed in a custom stained oak millwork frames with polished stainless-steel inlay. The outside edges are flush with the drywall using a reveal bead and the interiors of the frame are step flush with the monitors. The system uses an automation control system to bring on/off the displays in custom scenes with a server sitting in an automation rack, hidden by a sliding door.

The system further includes the APP has described above. The APP is configured to operate on a mobile device, such as a phone, tablet, or computer. The system would display as noted above, images both static, dynamic, and videos under a specific license to the end user.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A system for the delivery and display of digital artwork content, the system comprising:
   a network interconnecting at least two monitors, a storage database, a user application, and a frontend web application and a server;
   a plurality of digital artwork content being stored on and accessible from the storage database;
   a user application configured to access the plurality of digital artwork content on the storage database, the user application further configured to send the frontend web application data information based on a user selection to display, on the at least two monitors, one or more of the plurality of digital artwork content;
   a frontend web application configured to receive data information from the user application and configured to send control instructions to the server, wherein the control instructions configure the server to download from the storage database one or more of the plurality of digital artwork content based on the user selection and further configured to display the downloaded digital artwork content on the at least two monitors; and
   wherein the user application is further configured to arrange the at least two monitors in different configurations based on user input and configured to send a configuration arrangement instruction to the frontend web application to process in the display of the digital artwork content, such that the digital artwork displayed on the at least two monitors include (a) different digital artwork content displayed on each of the at least two monitors and (b) a single digital artwork content, from the plurality of digital artwork content, displayed across the at least two monitors wherein the single digital artwork content is divided into digital artwork portions by a number equal to the configuration arrangement instruction of the at least two monitors and said digital artwork portions being displayed across the at least two monitors to maintain a visual representation of the single digital artwork content.

2. The system of claim 1, wherein the system further includes a backend API to interconnect the user application software and the frontend web application.

3. The system of claim 2, wherein the user selection of one or more of the plurality of digital artwork content defines a scene of digital artwork content.

4. The system of claim 3, wherein the digital artwork content includes high resolution static and dynamic images, gifs, and video.

5. The system of claim 1, wherein the frontend web application is configured to confirm a subscription from the user to access the storage database prior to sending control instructions to the server.

6. The system of claim 5, wherein the frontend web application is configured to remove the digital artwork content from one or more monitors when the subscription from the user terminates.

7. The system of claim 1, wherein the user app is further configured to send user created images to the storage database for display on the one or more monitors.

8. The system of claim 1, wherein the user app is further configured to arrange the one or more digital artwork content in genres, artist lists, and collection lists.

9. The system of claim 1, wherein
   the at least two monitors consists of at least three monitors,
   the configuration arrangement instruction includes at least two monitors of the at least three monitors, and
   the single digital artwork content is divided into at least two equal digital artwork portions, such that each of the at least two monitors receives a separate equal digital artwork portion for display thereon, whereby the single digital artwork content is visually displayed in portions across the at least two monitors.

* * * * *